United States Patent [19]

Tamamura et al.

[11] Patent Number: 4,479,705
[45] Date of Patent: Oct. 30, 1984

[54] FILM TRANSPORTATION DEVICE IN CAMERA

[75] Inventors: Hideo Tamamura, Tokyo; Mutsuhide Matsuda, Kanagawa; Toyotosi Suzuki; Takashi Endo, both of Tokyo, all of Japan

[73] Assignee: Canon Kabushiki Kaisha, Tokyo, Japan

[21] Appl. No.: 459,219

[22] Filed: Jan. 19, 1983

Related U.S. Application Data

[63] Continuation of Ser. No. 379,449, May 18, 1982, abandoned, which is a continuation of Ser. No. 245,350, Mar. 19, 1981, abandoned.

[30] Foreign Application Priority Data

Mar. 22, 1980 [JP] Japan .................................. 55-36766

[51] Int. Cl.$^3$ .......................... G03B 1/18; G03B 19/04
[52] U.S. Cl. .................................. 354/173.1; 354/213
[58] Field of Search .................................. 354/202–206, 354/170, 171, 173, 212–214; 242/71, 71.1

[56] References Cited

U.S. PATENT DOCUMENTS

| | | | |
|---|---|---|---|
| 2,879,704 | 3/1959 | Winkler et al. | 354/213 |
| 3,135,182 | 6/1964 | Hintze et al. | 354/173.1 |
| 3,633,480 | 1/1972 | Kondo | 354/212 |
| 4,171,892 | 10/1979 | Kozuki et al. | 354/173.1 |

*Primary Examiner*—Donald A. Griffin
*Attorney, Agent, or Firm*—Toren, McGeady and Stanger

[57] ABSTRACT

A spool drive type camera in which the taking up of the film is carried out only by the rotative force of the spool, while the one-frame advancement of the film is controlled by the revolution of the sprocket as it is driven by the film transportation is provided with automatic switching means for selection of a mode in which the above-described one-frame advancement is effected by the rotative force of the winding up system when a film is not loaded in the above-described camera.

17 Claims, 3 Drawing Figures

FILM TRANSPORTATION DEVICE IN CAMERA

This is a continuation of application Ser. No. 379,449 filed May 18, 1982, now abandoned which is a continuation of application Ser. No. 245,350 filed Mar. 19, 1981, now abandoned.

BACKGROUND OF THE INVENTION

1. Field of the Invention:

This invention relates to a film transportation device in cameras in which the film is transported by driving the takeup spool.

2. Description of the Prior Art:

In general, the film transportation in the camera is carried out by driving the sprocket and it is called sprocket drive. In this sprocket drive type camera, as the sprocket shaft is driven to rotate a certain angle, the film is advanced one frame and at the same time the shutter is charged. Therefore, in such camera, regardless of whether or not a film is loaded, the operation of the wind up lever or the like leads to drive the shutter charging mechanism and the like. For this reason, even when there is no film in the camera, a camera release can be made, thus enabling the operator to check the functions of the camera with very ease as its structure is suited for this.

In the case of the sprocket drive, however, the assurance of smooth movement of the film requires two sprockets upper and lower, connected to each other through a sprocket shaft. The bulk and size of the sprocket as a whole is, therefore, very large. Moreover, as the sprocket arrangement has no degree of freedom, the degree of freedom of the design is very limited. Further, the winding up force is applied by the sprockets directly on the perforations so that even a slight catch of the film often results in the breakage of the perforation and in cutting off the film.

To overcome this drawback, the prior art provides a spool drive type camera in which the film is transported by driving the shaft of the takeup spool. Since the winding up force is applied by the spool across the entire width of the film strip, the perforations are protected from damages and the possibility of cutting off the film can be very lessened.

But, in the spool drive type camera, as the film is taken up on the spool, the diameter of the convolution of the film is increased, thus gradually differentiating the length of film taken up on the spool by one revolution of the spool. Because of this, the maintenance of the constant length of the film taken up requires that the spool be stopped at a different position for every time. Since this is very difficult to achieve, use is made of a sprocket gear arranged to engage one of the upper and lower perforations and upon rotation through a certain angle to control the one-frame advancement of the film, and the operation of the film footage, and of the shutter charging mechanism. With such spool drive type camera, therefore, when the film is not yet loaded, the shutter cannot be charged by operating the wind up lever, and the operator is disabled from checking whether or not the camera well functions until the film is loaded.

Since the sprocket used in the spool drive camera is not necessarily to engage both of the upper and lower perforations, but suffices to engage one of them, it may be positioned at a desired location, for example, in the vicinity of one of the longitudinal margins of the exposure aperture thus contributing to the compactness of the camera. Another advantage is that when a motor drive unit is associated therewith, as the driving torque acts on the entire area of the film, there is no possibility of occurrence of breaking the perforations. Accordingly, the recently developed automatized cameras tend to employ this. But since, as has been mentioned above, the checking of the camera without a film loaded is inconvenient, a measure making it possible must be taken into account. The conventional measure is to provide for a changeover mechanism of complicated structure operating in such a manner that when the film is present, the shutter is charged by the sprocket moving as the film is transported, and when the film is absent, the changeover mechanism is switched to transmit the driving torque to the sprocket by which the shutter is charged.

However, the use of such complicated changeover mechanism increases the production cost, and at the same time necessitates a device for actuating the mechanism in response to detection of whether or not the film is present. The means for detecting the presence of the film is rather easy when in the form of detecting the presence of the film container. But, the shape of the film container differs to some extent, depending upon the kind of film or the like. Therefore, this must be taken into account when designing the detecting device.

An object of the present invention is, therefore, to eliminate the above-described drawbacks and to provide a control mechanism for shutter charge operating in such a manner that as a sprocket rotates along with the film transportation, when the rotation of the sprocket is detected, the rotative force of the sprocket is used to carry out the shutter charge and when the standstill of the sprocket is detected, the winding up driving force is used to carry out the shutter charge.

Another object of the present invention is to perform a one-frame advancement by the one of a gear cooperative with the sprocket and a gear cooperative with the winding up driving force which is imparted with rotative force.

Figure 1:
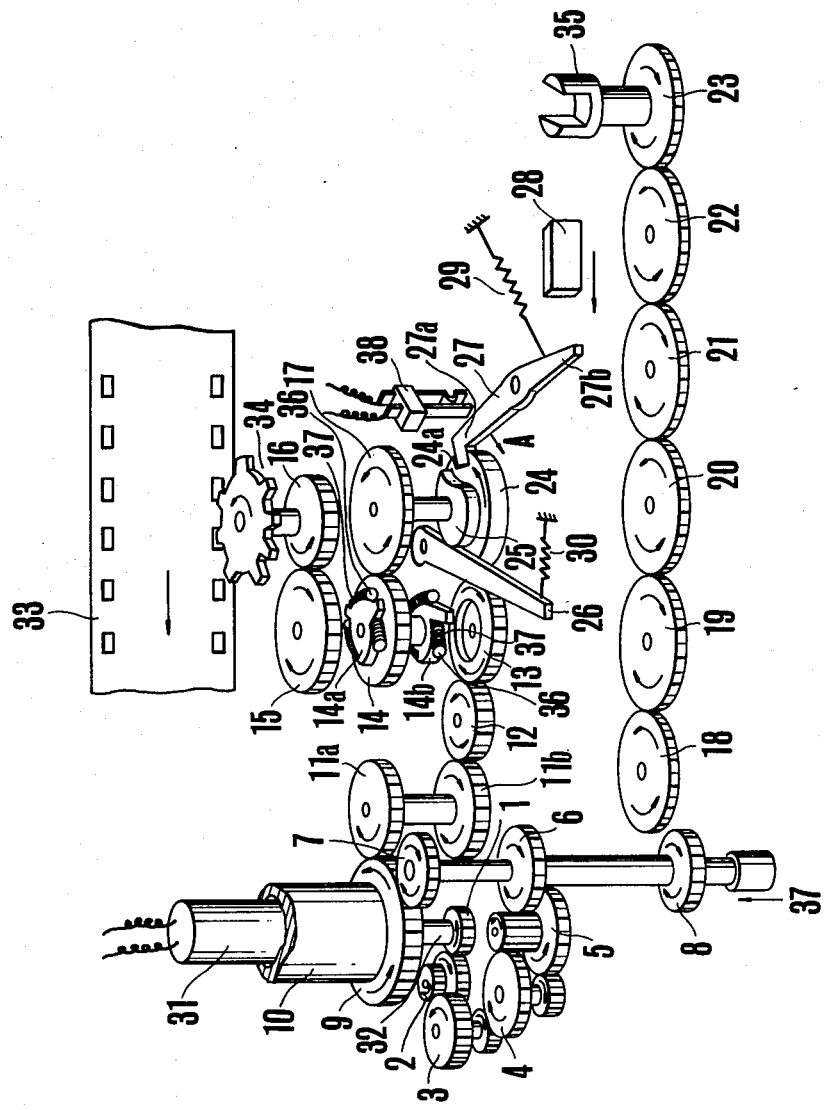
FIG. 1 is a perspective view of an embodiment of a film transportation mechanism in a camera according to the present invention.

DESCRIPTION OF THE PREFERRED EMBODIMENTS:

FIG. 1 shows a film transportation mechanism in the wound up position. In FIG. 1, 1 is a pinion fixedly mounted on an output shaft 32 of an electric motor 31 to be described more fully later; 2 to 6 are a speed reduction gear train meshing with the pinion gear 1; 7 is a wind up gear provided on the common shaft of the gear 6. 8 is a rewind gear provided on the common shaft of the gear 6. 9 is a gear in unison with a spool 10. In the illustrated position where a film 33 is on the way to be wound up, the gear 8 is separated from a gear 18 constituting part of a rewind gear train, while the gear 6 is meshing with the gear 9. 12 is a gear meshing through gears 11a and 11b with the gear 9; 13, 14 and 15 are gears constituting two one-way clutches. Between the gears 13 and 14 intervene a clutch 14b, balls 36 and springs 37, these parts constituting a first one-way clutch. Also between the gears 14 and 15 intervene likewise a clutch 14a, balls 36 and springs 37, these parts constituting a second one-way clutch. The gear 13 meshes with the gear 12, and the gear 15 meshes with a gear 16 on the common shaft of a sprocket 34. 17 is a gear meshing with the gear 14 and coaxially formed in unison with a one-frame advancement control disc 24 and a charge control cam 25. 18 to 23 are a rewind gear train with its last gear 23 equipped with a fork 35. The disc 24 has a cutout 24a formed in a portion thereof. The shutter charge control cam 25 cooperates with a lever 26 when charging the shutter (not shown). The lever 26 is urged to abut on the camming surface of the cam 25. 27 is a winding stop lever with its pawl 27a arranged to enter the cutout 24a in the disc 24. 28 is an actuator for the lever 27. When the shutter is closed, the actuator 28 moves in a direction indicated by arrow and finally strikes the lever 27 at its tail 27b, thereby the pawl 27a is moved away from the cutout 24a. 29 is a spring urging the lever 27 in a direction indicated by arrow A. The motor 31 is positioned in a hollow core of the takeup spool 10. 32 is the output shaft of the motor 31; 33 is the film; 34 is the sprocket; 35 is a rewinding fork; 38 is a switch for controlling the current supply to the motor 31. When this is closed, the motor 31 is energized. When open, the current is no longer supplied to the motor 31.

Figure 2:
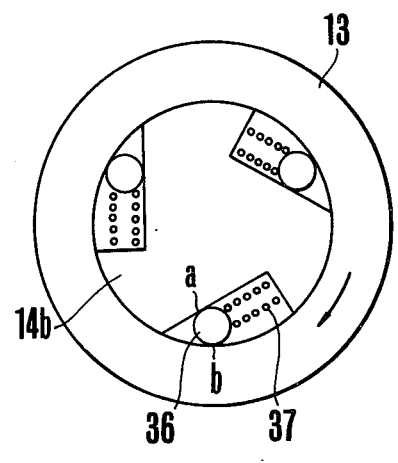
FIG. 2 is a plan view showing the details of the one-way clutch of FIG. 1.

Here FIG. 2 concretely shows the one-way clutches of FIG. 1. Between the inner periphery of the gear 13 and each recessed pocket in the hub 14b there is a ball 36 and a spring 37 which latter urges the ball to become wedged therebetween. When the gear 13 rotates in the direction indicated by arrow, the effective wedging of the ball 36 between the inner circumferential surface b of the gear 13 and the surface, a, of the recessed portion of the hub 14b takes place so that the gear 13 and the hub 14b rotate in unison. Conversely when the gear 13 rotates in the reverse direction to that indicated by arrow, the above-described ball 36 is caused to move toward a larger space in the recessed pocket against the force of the spring 37, and is no longer wedged between the surfaces, a, and, b, so that though the gear 13 rotates, the hub 14b does not rotate. Therefore, the illustrated mechanism functions as a one-way clutch. Also the gear 15 has an inner circumferential surface cooperative with the recessed pockets in the hub 14a in which similar balls and springs to those of FIG. 2 are positioned. This second one-way clutch operates in a similar manner.

The operation of the mechanism of such construction is as follows:

(1) In case the film is loaded in the camera.

When the camera is released by operating a shutter button (not shown), as the shutter is closed, the lever 28 moves in the direction indicated by arrow, causing the lever 27 to turn in the reverse direction to that indicated by arrow A until the pawl 27a is disengaged from the cutout 24a in the disc 24. At the same time, the switch 38 is closed by the shoulder of the lever 27 to supply the motor 31 with current from a drive circuit (not shown). As the motor 31 rotates, motion of the output shaft 32 is transmitted from the pinion 1 through the gear train 2 to 6 to the gear 7 and therefrom through the gear 9 to rotate the spool 10, thereby the film 33 is wound up on the spool 10.

As the film 33 moves forward, the sprocket 34 in engagement with its perforations is driven to rotate in a direction indicated by arrow. Motion of the sprocket 34 is transmitted through the sprocket gear 16 to the gear 15. Since the direction of rotation of the gear 15 renders effective the operation of the one-way clutch hub 14a, the clutch gear 14 is driven to rotate which is then transmitted to rotate the gear 17 in the direction indicated by arrow along with the disc 24 and cam 25. Such rotative movement of the cam 25 causes the control lever 26 to turn against the force of the spring 30, thus charging the shutter mechanism (not shown). It is noted here that as soon as the cutout 24a moves past the pawl 27a, the actuator lever 28 is retracted by means (not shown), but the pawl 27a remains riding on the periphery of the disc 24 so that the power supply control switch 38 continues being closed.

Then, when the disc 24 completes one revolution, as its output 24 comes to align with the pawl 27 again in the illustrated position of FIG. 1, the lever 27 is turned in the direction A under the action of the spring 29, thus stopping the above-described gear system from further rotation, and permitting the switch 38 to be closed and the motor 31 to be deenergized. Since the rotation ratio of the above-described disc 24 and the sprocket 34 is preadjusted to 1 : 1, as the foregoing action results in one revolution of the sprocket 34, the film is advanced through the length of one frame.

It is noted in this connection that motion of the motor 31 is also transmitted through the spool gear 9 and the gear train 11 and 12 to the gear 13 or clutch. But since the gear 13 runs slower than the gear 15 rotating along with the sprocket 34, motion of the gear 13 is not transmitted by the clutch 14b to the gear 14, thus not reaching the disc 24 through the gears 14 and 17. As a result, rotation of the disc 24 is controlled only by the movement of the film 33. Therefore, the advancement of the film through the length of one frame completes one revolution of the sprocket 34 and therefore one cycle of winding operation.

(2) In case where the camera lacks the film.

When a shutter release is actuated, as the shutter is then closed, the lever 27 is turned in the reverse direction to that indicated by arrow A, thereby the pawl 27a is moved away from the cutout 24a and the motor 31 is energized likewise as in the former case. Though motion of the motor 31 is transmitted through the gear train 2 to 6 and the wind-up gear to the spool gear 9 and the spool 10 is driven to rotate, because of the absence of the film 33, the sprocket 34 remains stationary, and therefore the gears 16 and 15 are not driven to rotate. Motion of the spool gear 9 is transmitted through the gears 11 and 12 to the gear 13. As the gear 13 rotates in the direction indicated by arrow, this motion is transmitted through the one-way clutch 14b to the gear 14. Since, as has been mentioned above, the sprocket side gear 15 is standstill, motion of the clutch gear 14 is not transmitted beyond the one-way clutch 14a to the gear 15, but is routed through the gear 17 to rotate the disc 24 and cam 25 as in the case (1). Its one revolution charges the shutter, and turns off the switch 38, thus completing one cycle of shutter charging operation.

(3) When to rewind the film.

As the mechanism of FIG. 1 is motorized, when a rewind button 37 is pushed upward or in a direction indicated by arrow, the gears 6, 7 and 8 on the shaft 37 are moved so that the gear 7 is taken out of the connection with the spool gear 9, and instead the gear 8 is brought into meshing engagement with the gear 18 with which the rewind gear train begins. The other gear 6 is maintained meshed with the gear 5 because the coaxial gear thereto is so axially elongated. Responsive to this upward movement of the shaft 37, the lever 27 is caused to turn in the reverse direction to that indicated by arrow through an intermediary (not shown) and to close the switch 38. Then, motion of the motor 31 is transmitted through the gear train 1 to 6 to the gear 8 and therefrom through the rewind gear train 18 to 23 to rotate the coaxial form 38 to the gear 23, thus the film is rewound on the supply spool (not shown). The backward movement of the film 33 rotates the sprocket in the reversed direction to that in which the film 33 is wound up. But, since the direction of rotation of the gear 15 driven by the sprocket 34 permits free-wheeling of the one-way clutch hub 14b, motion of the gear 15 is not transmitted to the gear 14. Therefore, the shutter charging mechanism including the disc 24 is not affected by this motion. Also the one-way clutch hub 14b and the gear train 13 to 11 are standstill and therefore this reversed driving force is not applied to the spool 10. It is noted that when the film is not loaded, the switching to the rewind mode by the upward movement of the rewind button is followed by a similar procedure to that described above with the result that motion of the motor 31 is transmitted only to the fork 35.

Figure 3:
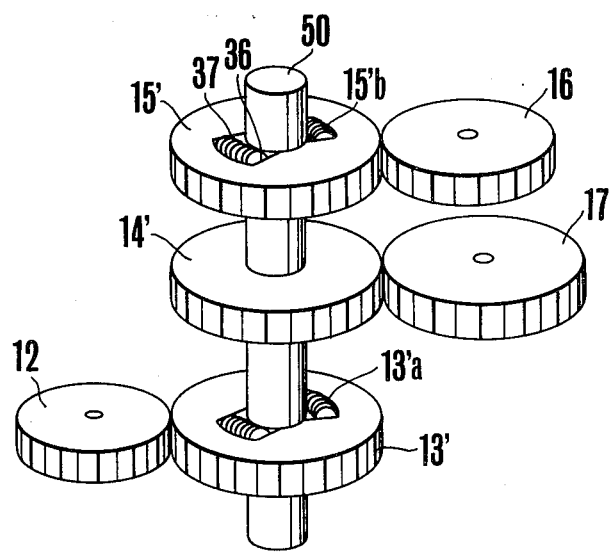
FIG. 3 is a perspective view of another example of the one-way clutch of FIG. 1.

FIG. 3 shows another example of the one-way clutch construction usuable in the mechanism of FIG. 1. Between a shaft 50 fixedly carrying a gear 14' and either of the cores of gears 15' and 13' are formed respective one-way clutches 15'b and 13'a. The action of these clutches is similar to that of the clutches shown in FIG. 2.

As has been described in greater detail, according to the present invention, the use of the one-way clutches makes it possible that when the film is loaded in the camera, a spool drive type camera is established as in the prior art, and even when the film is absent, a camera release followed by a shutter charge can be actuated without the reccurse to opening and closing of the back cover of the camera which is necessary in the conventional spool drive type camera. Thus, the camera of the invention can be managed in a similar fashion to that in which the conventional sprocket drive camera is done. Another advantage of the invention is that even when the film is to be rewound, the operator is not suffered from paying attension to a particular device for taking the sprocket out of the connection with the shutter charging mechanism and therefore the film transporting mechanism can be constructed in a simple form. This gives an additional advantage that the compactness of the camera which is characteristic of the spool drive type is further improved.

What is claimed is:
1. A winding up device for a camera including:
 (a) a takeup spool;
 (b) winding-up means for driving said spool to move in a winding up direction;
 (c) a sprocket arranged to be driven to rotate as said spool winds up a film;
 (d) a first one-way clutch for transmitting motion of said sprocket in a film winding up direction;
 (e) a second one-way clutch for transmitting motion of said winding up means in the winding up direction; and
 (f) one-frame advancement control means cooperative with both of said first and said second one-way clutches, whereby when the film is loaded in said camera, said one-frame advancement control means is operated by the force transmitted by said first one-way clutch, and when the film is not loaded, it is operated by the force transmitted by said second one-way clutch.

2. A winding up device according to claim 1, further including a speed reduction gear between said winding up means and said second one-way clutch so that said sprocket runs faster, permitting said first one-way clutch to transmit motion of said sprocket to said one-frame advancement control means.

3. A winding up device according to claim 2, where said first and said second one-way clutches are arranged in coaxial relation to each other.

4. A winding up device according to claim 2, wherein said spool has a spool gear and winding up force of said winding up means is transmitted through the speed reduction gear and spool gear to said second one-way clutch.

5. A winding up device according to claim 4, further including:
 (g) film rewinding means; and
 (h) change over means for changing over the winding up force of said winding up means from one of said spool gear and said rewinding means to the other.

6. A winding up device according to claim 2, wherein said winding up means is provided with an electric motor and the driving force of said motor is utilized as the winding up force.

7. A winding up device for a camera including:
 (a) a takeup spool;
 (b) winding up means for driving said spool to move in a winding up direction;
 (c) a sprocket arranged to be driven to rotate as said spool winds up a film;
 (d) one-frame advancement control means; and
 (e) transmission means for transmitting either one of the driving force of said sprocket and the winding up force of said winding up means to said one-frame advancement control means, said transmission means having detecting means for detecting whether or not said sprocket is driven to rotate in the film winding up direction, whereby when rotation of said sprocket is detected by said detecting means, the driving force of said sprocket is transmitted to said one-frame advancement control means, and when standstill of said sprocket is detected by said detecting means, the winding up force of said winding up means is transmitted to said one-frame advancement control means.

8. A winding device for a camera including:
 (a) a takeup spool;
 (b) winding means for driving said spool to move in a winding direction;
 (c) a sprocket arranged to rotate as said spool winds film;
 (d) single frame advancement control means; and (e) transmission means for transmitting either one of the driving force of said sprocket and the winding force of said winding means to said single frame advancement control means, said transmission means having a clutch for transmitting the driving force of the sprocket to the single frame advancement control means when the film is wound on the spool, and transmitting the winding force of the winding means to the single frame advancement control means when the film is not wound on the spool.

9. A winding device according to claim 8, wherein the clutch is a one-way clutch.

10. A winding device according to claim 9, wherein the transmission means has a first rotation member rotatable by the winding force of the winding means, and a second rotation member associated with the sprocket, and the one-way clutch being arranged to detect the relative speeds of the first and second rotation members and transmit the rotation force of the rotation member which is rotating faster.

11. An electric driving device for a camera, comprising:
   (a) a takeup spool;
   (b) driving means for driving said spool in a winding direction;
   (c) a sprocket arranged to be driven to rotate as said spool winds a film;
   (d) shutter charging means;
   (e) transmission means for transmitting either of the driving force of the sprocket and driving force of the driving means to the shutter charging means;
   (f) said transmission means having a clutch for transmitting the driving force of the sprocket to the shutter charging means when the film is wound on the spool, and for transmitting the driving force of the driving means to the shutter charging means when the film is not wound on the spool.

12. An electric driving device according to claim 11, further comprising single frame advancement control means associated with the shutter charging means.

13. An electric driving device according to claim 12, further comprising film rewinding means for rewinding film and wherein the transmission means includes changeover means for transmitting the driving force of the driving means from the shutter charging means and the single frame advancement control means to the film rewinding means.

14. A winding device for a camera, comprising:
   a first drive system for performing a single-frame advance in correspondence to a film winding operation by means of a film;
   a second drive system for performing a single-frame advance in correspondence to the film winding operation without film; and
   means for actuating one of the first and second drive systems.

15. A winding device according to claim 14, wherein the actuating means is a detection means for detecting a speed difference between the first and second drive systems, said detecting means actuating either of the first and second drive systems operating at a greater driving speed.

16. A winding device for a camera, comprising:
   a first drive system for performing a shutter charge in correspondence to a winding operation by means of a film;
   a second drive system for performing a shutter charge in correspondence to a winding operation without film; and
   means for effectuating either of the first and second drive systems and nullifying at least one of the first and second drive systems when the drive of the drive systems is changed from one direction to another direction.

17. A winding device for a camera, comprising:
   a first drive system for performing a single-frame advance in correspondence to a winding operation by means of a film;
   a second drive system for performing a single-frame advance in correspondence to the winding operation without film; and
   selection means for effectuating either of the first and second drive systems and effectuating the first drive system when the film is loaded and effectuating the second drive system when the film is not loaded.

* * * * *